United States Patent
Hayashizaki et al.

(10) Patent No.: US 12,362,961 B2
(45) Date of Patent: Jul. 15, 2025

(54) PROGRAM REWRITING DEVICE AND PROGRAM REWRITING METHOD

(71) Applicant: TOYOTA JIDOSHA KABUSHIKI KAISHA, Toyota (JP)

(72) Inventors: Kengo Hayashizaki, Seto (JP); Masashi Amesara, Toyota (JP); Masahide Ozaki, Anjo (JP); Hidetaka Nakane, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 18/406,876

(22) Filed: Jan. 8, 2024

(65) Prior Publication Data

US 2024/0235883 A1 Jul. 11, 2024

(30) Foreign Application Priority Data

Jan. 11, 2023 (JP) .................................. 2023-002412

(51) Int. Cl.
*H04L 12/40* (2006.01)
*H04L 12/66* (2006.01)

(52) U.S. Cl.
CPC .............. *H04L 12/40* (2013.01); *H04L 12/66* (2013.01); *H04L 2012/40273* (2013.01)

(58) Field of Classification Search
CPC ...................... H04L 12/40; H04L 12/66; H04L 2012/40273
See application file for complete search history.

(56) References Cited

U.S. PATENT DOCUMENTS

| | | | | |
|---|---|---|---|---|
| 6,535,939 B1* | 3/2003 | Arimilli | .................. | G06F 13/36 710/305 |
| 11,700,214 B1* | 7/2023 | Yokoi | ................. | H04L 49/9052 370/412 |
| 2018/0074752 A1* | 3/2018 | Nakazono | ............. | G06F 3/0683 |
| 2019/0295517 A1* | 9/2019 | Sato | .......................... | G10H 1/24 |

FOREIGN PATENT DOCUMENTS

JP 2010-271891 A 12/2010

\* cited by examiner

*Primary Examiner* — Henry Tsai
*Assistant Examiner* — John B Roche
(74) *Attorney, Agent, or Firm* — Oliff PLC

(57) ABSTRACT

Processing circuitry of a program rewriting device is configured to create a transfer queue for each bus by grouping update data for each electronic control unit, assign threads to transfer queues one by one, starting with a transfer queue with a relatively large transfer data amount, perform parallel transfer of the update data of the transfer queues to the gateway device by using the assigned threads, each time transfer of a piece of the update data is completed, select a transfer queue having a largest transfer data amount from among the transfer queue in which the transfer of the update data is completed and transfer queues to which the threads have not been assigned and in which transfer of the update data is suspended, and continue the parallel transfer by assigning, to the selected transfer queue, the thread assigned to the transfer queue for which the transfer has been completed.

5 Claims, 6 Drawing Sheets

PROGRAM REWRITING DEVICE AND PROGRAM REWRITING METHOD

BACKGROUND

1. Field

The present disclosure relates to a program rewriting device and a program rewriting method.

2. Description of Related Art

Japanese Laid-Open Patent Publication No. 2010-271891 discloses a vehicle on-board network system in which multiple electronic control units are connected to each of multiple buses. In the vehicle on-board network system disclosed in the above publication, a gateway device transmits data received from a rewriting device to each electronic control unit. The gateway device assigns pieces of the data received from the rewriting device to each bus, thereby transmitting the data to the electronic control units connected to the respective buses in parallel.

When data is transferred from a program rewriting device to the vehicle on-board network system, using multiple threads to transfer the data multiple buses in parallel allows the data transfer to be completed quickly. The rewriting of programs is thus completed quickly. However, the resources of the program rewriting device are limited. Therefore, when the number of buses in the vehicle on-board network system is relatively large, the number of threads that can be used for parallel transfer may be insufficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a program rewriting device is configured to be connected to a vehicle on-board network system including multiple buses connected to a gateway device. The program rewriting device is configured to rewrite programs of multiple electronic control units connected to each of the buses. The program rewriting device includes a storage device configured to store update data to be transferred to the electronic control units, processing circuitry, and multiple threads configured to transfer the update data to the gateway device. The processing circuitry is configured to acquire information about a number of the buses connected to the gateway device and about the electronic control units connected to each bus, create, based on the information, a transfer queue for each bus by grouping the update data to be transferred to each electronic control unit for each corresponding bus, compare transfer data amounts in the transfer queues with each other, and assigns the multiple threads to the transfer queues one by one, starting with the transfer queue with a relatively large transfer data amount, and perform parallel transfer of the update data of the transfer queues to which the threads are assigned to the gateway device by using the threads. The processing circuitry is also configured to, each time transfer of a piece of the update data in any one of the transfer queues is completed, select a transfer queue having a largest transfer data amount from among the transfer queue in which the transfer of the piece of the update data is completed and one or more transfer queues to which the threads have not been assigned and in which transfer of the update data is suspended. The processing circuitry is further configured to continue the parallel transfer by assigning, to the selected transfer queue, the thread assigned to the transfer queue for which the transfer has been completed.

In another general aspect, a program rewriting method is executed by a program rewriting device for a vehicle on-board network system including multiple buses connected to a gateway device. The program rewriting device is configured to rewrite programs of multiple electronic control units connected to each of the buses. The program rewriting method includes acquiring information about a number of the buses connected to the gateway device and about the electronic control units connected to each bus, creating, based on the information, a transfer queue for each bus by grouping update data to be transferred to each electronic control unit for each corresponding bus, comparing transfer data amounts in the transfer queues with each other, and assigning multiple threads to the transfer queues one by one, starting with the transfer queue with a relatively large transfer data amount, and performing parallel transfer of the update data of the transfer queues to which the threads are assigned to the gateway device by using the threads. The program rewriting method also includes, when transfer of a piece of the update data in any one of the transfer queues is completed, selecting a transfer queue having a largest transfer data amount from among the transfer queue in which the transfer of the piece of the update data is completed and one or more transfer queues to which the threads have not been assigned and in which transfer of the update data is suspended. The program rewriting method further includes continuing the parallel transfer by assigning, to the selected transfer queue, the thread assigned to the transfer queue for which the transfer has been completed.

Other features and aspects will be apparent from the following detailed description, the drawings, and the claims.

BRIEF DESCRIPTION OF THE DRAWINGS

FIG. 5 is an explanatory diagram of assignment of transfer threads according to a modification.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Figure 1:
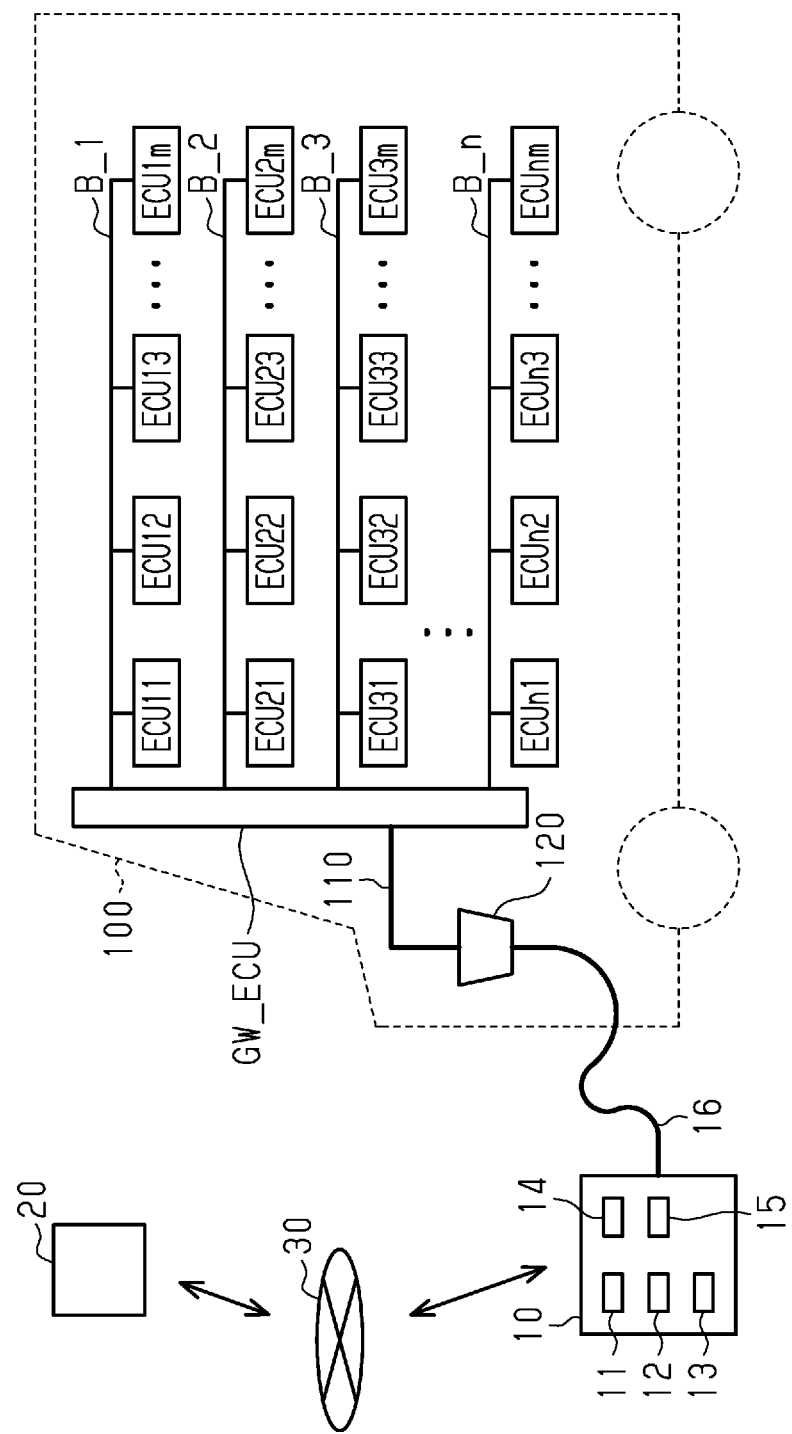
FIG. 1 is a schematic diagram illustrating a rewriting device and a vehicle on-board network system.

Hereinafter, a rewriting device 10 which is an embodiment of a program rewriting device will be described with reference to FIGS. 1 to 4. FIG. 1 shows a rewriting device 10 and a vehicle 100.

Configuration of Vehicle 100

The vehicle 100 includes a gateway device GW_ECU and a plurality of buses connected to the gateway device GW_ECU. The plurality of buses are CAN (registered trademark) buses. FIG. 1 shows a first bus B_1 to an n-th bus B_n. "n" is a positive integer. FIG. 1 shows that the vehicle 100 comprises n buses.

A plurality of electronic control units are connected to each bus. FIG. 1 shows a plurality of electronic control units from an electronic control unit ECU 11 to an electronic control unit ECU nm. The symbol m is a positive integer. FIG. 1 shows that m electronic control units from electronic control unit ECU 11 to electronic control unit ECU 1m are connected to the first bus B_1. The symbol n in ECU nm of the electronic control units indicates the bus number. The symbol m in ECU nm which is the symbol of the electronic control unit indicates the number of the electronic control unit. For example, the electronic control unit ECU 33 indicates a third electronic control unit connected to the third bus B_3. Although FIG. 1 illustrates an example in which the same number of electronic control units are connected to each bus, the number of electronic control units connected to each bus may be different for each bus.

As shown in FIG. 1, a vehicle 100 includes a vehicle on-board network system including a plurality of buses connected to a gateway device GW_ECU.

Each electronic control unit realizes various functions in the vehicle 100. For example, one of the plurality of electronic control units controls the engine. One of the plurality of electronic control units controls the brake. One of the plurality of electronic control units controls a car navigation system and an audio system. One of the plurality of electronic control units implements advanced driving assistance. One of the plurality of electronic control units controls the drive recorder. One of the plurality of electronic control units detects a collision and activates the air bag. One of the plurality of electronic control units provides an emergency alert when the air bag is activated. One of the plurality of electronic control units detects unauthorized intrusion into the vehicle 100 and activates an alarm device. Each of the plurality of electronic control units stores a program for realizing a corresponding function.

Configuration of Rewriting Device 10

The rewriting device 10 is a program rewriting device that rewrites the programs of the plurality of electronic control units. The rewriting device 10 includes a storage device 12 for storing update data to be transferred to each electronic control unit, and processing circuitry 11. The storage device 12 also stores a program executed by the processing circuitry 11. The processing circuitry 11 is a multi-core processor. The rewriting device 10 includes an input device 14 operated by an operator. For example, the input device 14 is a keyboard. The rewriting device 10 includes a display device 13. For example, the display device 13 is a liquid crystal display. The rewriting device 10 may include a touch panel having both the function of the display device 13 and the function of the input device 14 as the display device 13 and the input device 14. The rewriting device 10 includes a communication device 15.

The rewriting device 10 is communicably connected to the server 20 via the network 30 using the communication device 15. A rewriting device 10 downloads update data to be transferred to each electronic control unit from a server 20 and stores it in a storage device 12.

As shown in FIG. 1, a transfer bus 110 is connected to the gateway device GW_ECU. The transfer bus 110 is a bus capable of transferring more data at a higher speed than the CAN. For example, the transfer bus 110 is a bus using CAN-FD (CAN with Flexible Data rate) which is a protocol capable of transferring more data at a high speed than CAN. The transfer bus 110 is provided with a connector 120. The rewriting device 10 includes a cable 16 connected to the connector 120. By connecting the cable 16 to the connector 120, the rewriting device 10 is connected to the vehicle on-board network system. The rewriting device 10 can be detachably connected to a vehicle on-board network system. A rewriting device 10 transfers update data to each electronic control unit and rewrites a program of each electronic control unit in a state of being connected to an on-vehicle network system.

The processing circuitry 11 includes a plurality of transfer threads. The transfer thread is an execution entity of transfer processing of update data. For example, the processing circuitry 11 includes three transfer threads of a first thread S_1, a second thread S_2, and a third thread S_3. The rewriting device 10 transfers the update data to the gateway device GW_ECU in parallel using a plurality of transfer threads. If the update data is transferred to the plurality of buses in parallel by using the plurality of threads, the transfer of the update data is quickly completed. Therefore, the rewriting of the program of each electronic control unit is quickly completed.

However, each bus connecting each electronic control unit to the gateway device GW_ECU has a data transfer speed lower than that of the transfer bus 110. Therefore, when the update data addressed to each of the plurality of electronic control units is simultaneously transferred to one bus, the transfer speed is not sufficient and the update data cannot be appropriately transferred. In addition, resources of the rewriting device 10 are limited. Therefore, when the number of buses in the vehicle on-board network system is large, the number of transfer threads that can be used for parallel transfer becomes insufficient. In this case, the rewriting device 10 cannot transfer the update data to all the buses in parallel. Therefore, the rewriting device 10 needs to adjust the transfer order of the update data in accordance with the number of buses in the vehicle on-board network system and the number of electronic control units connected to each bus.

Update Data Transfer Routine

An update data transfer routine executed by the rewriting device 10 will be described with reference to FIG. 2. This routine is executed by the processing circuitry 11 when execution of the transfer routine is instructed by the operator via the input device 14 in a state where the cable 16 of the rewriting device 10 is connected to the connector 120.

Figure 2:
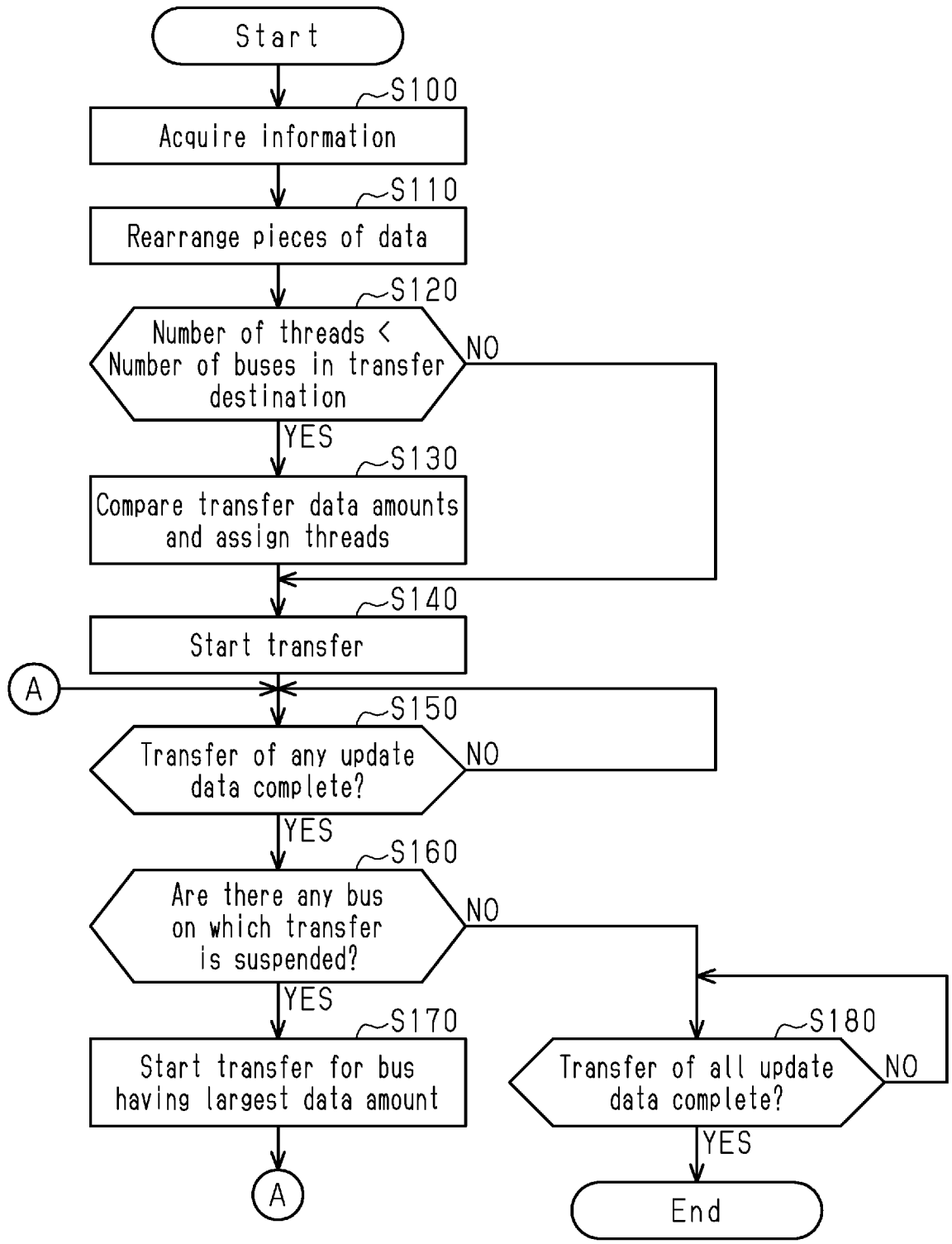
FIG. 2 is a flowchart showing a procedure of processes executed by the processing circuitry shown in FIG. 1.

As shown in FIG. 2, when the transfer routine is started, the processing circuitry 11 acquires information of the vehicle on-board network system in the processing of step S100. For example, the processing circuitry 11 acquires, from the gateway device GW_ECU, information on the number of buses included in the vehicle on-board network system, the number of electronic control units connected to each bus, and the type of each electronic control unit.

In the process of the subsequent step S110, the processing circuitry 11 rearranges pieces of data to be transferred to each of the electronic control units based on the acquired information. Specifically, the processing circuitry 11 creates a transfer queue for each bus. A queue is a data structure that arranges elements in the order they are added, and operates under the rule of extracting elements in the same order they were added, meaning the element added first is extracted first. The processing circuitry 11 groups pieces of update data to be transferred to each electronic control unit for each corresponding bus, and stores a transfer event of each piece of the update data in a transfer queue for each bus. For example, the processing circuitry 11 arranges pieces of the update data grouped for each bus in descending order of the data amount. Then, the processing circuitry 11 stores the transfer events in the transfer queue in order from the transfer event of the update data having a relatively large data amount.

Figure 3:
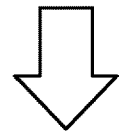
FIG. 3 is an explanatory diagram of assignment of transfer threads in the process shown in FIG. 2.
Figure 3:
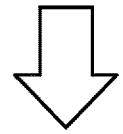

Part (a) of FIG. 3 shows the order of transfer events in each of the five transfer queues in the case where update data is transferred to a plurality of electronic control units connected to each of the five buses from the first bus B_1 to the fifth bus B_5. In part (a) of FIG. 3, the transfer events are executed first from the transfer event located on the left side. In this example, four electronic control units from an electronic control unit ECU 11 to an electronic control unit ECU 14 are connected to the first bus B_1 as a plurality of electronic control units to be updated. Three electronic control units ECU 21 to ECU 23 are connected to the second bus B_2 as a plurality of electronic control units to be updated. Three electronic control units ECU 31 to ECU 33 are connected to the third bus B_3 as a plurality of electronic control units to be updated. Three electronic control units ECU 41 to ECU 43 are connected to the fourth bus B_4 as a plurality of electronic control units to be updated. Three electronic control units ECU 51 to ECU 53 are connected to the fifth bus B_5 as a plurality of electronic control units to be updated.

As shown in part (a) of FIG. 3, when the amounts of the four updates transferred through the first bus B_1 are compared, the amount of the update transferred to the electronic control unit ECU 13 is the largest. The next largest update datum to the update datum to be transferred to the electronic control unit ECU 13 is the update datum to be transferred to the electronic control unit ECU 12. The next largest update datum to the update datum to be transferred to the electronic control unit ECU 12 is the update datum to be transferred to the electronic control unit ECU 14. Among the four updates transmitted via the first bus B_1, the update transmitted to the electronic control unit ECU 11 has the smallest amount of update. Therefore, in the transfer queue for the first bus B_1, as shown in part (a) of FIG. 3, a transfer event addressed to the electronic control unit ECU 13, a transfer event addressed to the electronic control unit ECU 12, a transfer event addressed to the electronic control unit ECU 14, and a transfer event addressed to the electronic control unit ECU 11 are stored in this order.

As shown in part (a) of FIG. 3, transfer events are similarly stored in the transfer queues for the second bus B_2 to the fifth bus B_5 in descending order of data amount. As described above, in the process of step S110, the processing circuitry 11 creates each transfer queue by rearranging the update date to be transferred in descending order of the amount of the update date.

In the process of the next step S120, the processing circuitry 11 determines whether or not the number of transfer threads is less than the number of update-data transfer destination buses. For example, since the processing circuitry 11 has three transfer threads, when the number of transfer destination buses is five as in the example of FIG. 3 described above, the processing circuitry 11 determines that the number of transfer threads is less than the number of transfer destination buses of the update data.

In the process of Step S120, when the processing circuitry 11 determines that the number of transfer threads is less than the number of update-data transfer destination buses (S120: YES), the process proceeds to Step S130.

In the process of step S130, the processing circuitry 11 compares the transfer data amounts in the respective transfer queues and assigns the three transfer threads to the selected three transfer queues. A transfer data amount is the sum of the data amounts of update data to be transferred in each transfer queue. When the number of transfer destination buses is five as in the example of FIG. 3, one transfer thread is assigned to each of three transfer queues having larger transfer data amounts among the five transfer queues. For example, in the case of the example illustrated in part (a) of FIG. 3, the bus having the largest transfer data amount is the second bus B_2. The bus having the second largest amount of transfer data is the third bus B_3. The bus having the third largest amount of transfer data is the first bus B_1. Accordingly, the processing circuitry 11 assigns one transfer thread to each of the transfer queue of the second bus B_2, the transfer queue of the third bus B_3, and the transfer queue of the first bus B_1. In the example of part (a) of FIG. 3, the processing circuitry 11 assigns the first thread S_1 to the transfer queue of the first bus B_1. The processing circuitry 11 assigns the second thread S_2 to the second bus B_2. The processing circuitry 11 assigns the third thread S_3 to the third bus B_3. When the processing circuitry 11 assigns the transfer threads in this manner, the process proceeds to step S140.

Depending on the configuration of the vehicle on-board network system in the vehicle 100 to which the rewriting device 10 is connected, the number of transfer threads may be equal to or greater than the number of buses of the transfer destination of the update data. In this case, the processing circuitry 11 can assign transfer threads one by one to the transfer queues of all the buses. In the process of Step S120, when the processing circuitry 11 determines that the number of transfer threads is equal to or greater than the number of update-data transfer destination buses (S120: NO), the process proceeds to Step S140.

In the process of step S140, the processing circuitry 11 starts the transfer of the update-data in the transfer queue of the bus to which the transfer thread is assigned. The processing circuitry 11 transfers the update data to the gateway device GW_ECU using the transfer thread in accordance with the order of the transfer events in the transfer queue. The processing circuitry 11 has three transfer threads. Therefore, the processing circuitry 11 can transfer up to three pieces of update data in parallel. The gateway device GW_ECU transfers the update data transferred from the rewriting device 10 to the destination electronic control unit through the bus to which the destination electronic control unit is connected. Upon receiving the update data, the electronic control unit updates the program.

In the process of the next step S150, the processing circuitry 11 determines whether or not the transfer of any one of the update datasets is completed. In the process of step S150, when the processing circuitry 11 determines that the transfer of any update datum has not been completed (S150: NO), the process of step S150 is repeated. On the other hand, in the process of step S150, when the processing circuitry 11 determines that the transfer of any one of the update datasets is completed (S150: YES), the process proceeds to step S160.

Part (b) of FIG. 3 illustrates an example in which one transfer thread is assigned to each of the first bus B_1, the second bus B_2, and the third bus B_3 to execute parallel transfer. Part (b) of FIG. 3 shows a state at a point in time when the transfer of the update of the electronic control unit ECU 13 is completed and the first transfer event in the transfer queue of the first bus B_1 is completed. The amount of update data remaining on the right side of the broken line L_1 in part (b) of FIG. 3 represents the amount of remaining transfer data in each transfer queue. In this example, the parallel transfer is performed on the first bus B_1, the second bus B_2, and the third bus B_3 to which the transfer threads are assigned. Therefore, as shown in part (b) of FIG. 3, the remaining transfer data amounts in the transfer queues of these buses decrease. On the other hand, the remaining transfer data amounts in the transfer queues of the fourth bus B_4 and the fifth bus B_5 to which the transfer thread is not assigned do not change. When the transfer of the update datum for the electronic control unit ECU 13 having the smallest amount of the update datum being transferred is completed, the processing circuitry 11 determines that the transfer of any one of the update datum is completed (S150: YES).

In the process of step S160, the processing circuitry 11 determines whether or not there is a bus on which transfer is suspended. As shown in part (b) of FIG. 3, the transfer event in the transfer queue to which the transfer thread is not assigned is not executed. A bus on which a transfer event has not been executed because no transfer thread has been assigned is a bus on which a transfer is pending. In the case of the example shown in part (b) of FIG. 3, the fourth bus B_4 and the fifth bus B_5 are which the transfer is suspended. In the process of step S160, when the processing circuitry 11 determines that there is a bus on which transfer is suspended (S160: YES), the process proceeds to step S170.

In the process of step S170, the processing circuitry 11 reviews the assignment of the transfer threads and starts transfer for the bus having the largest remaining transfer data amount. Specifically, the processing circuitry 11 searches for a bus having the largest amount of remaining transfer data from among at least one bus for which transfer is suspended and buses for which transfer of a piece of update data has been completed. The processing circuitry 11 assigns the transfer thread that has been assigned to a transfer queue of the bus in which the transfer has been completed to the transfer queue of the bus having the largest remaining transfer data amount.

In the case of the example illustrated in part (b) of FIG. 3, the bus having the largest remaining transfer data amount among the first bus B_1, the fourth bus B_4, and the fifth bus B_5 is the fifth bus B_5. Therefore, the processing circuitry 11 assigns the first thread S_1 assigned to the transfer queue of the first bus B_1 to the transfer queue of the fifth bus B_5. Then, the processing circuitry 11 starts transfer of the update data in the transfer queue of the fifth bus B_5. When the process of step S170 is executed, the process returns to step S150.

In this way, the processing circuitry 11 repeatedly executes the processing from step S150 to step S170 while there is a bus on which transfer is suspended. Thus, every time the transfer of any update data is completed, the transfer thread is reassigned to the transfer queue of the bus having the largest remaining transfer data amount. Then, the parallel transfer using the three threads is continued.

Part (c) of FIG. 3 illustrates a state at a point in time when the transfer of the update of the electronic control unit ECU 33 is completed as a result of executing the parallel transfer after reassigning the transfer thread to the fifth bus B_5. The amount of update data shown on the right side of the broken line L_2 in part (c) of FIG. 3 represents the remaining transfer data amount in each transfer queue at this point in time. When the transfer of the update datum of the electronic control unit ECU 33 is completed, the processing circuitry 11 determines that the transfer of any of the update datum is completed (S150: YES). In the case of this example, the third thread S_3 assigned to the transfer queue of the third bus B_3 is assigned to the transfer queue of the fourth bus B_4. Then, the transfer of the update addressed to the electronic control unit ECU 42 which is the first transfer event in the transfer queue of the fourth bus B_4 is started. When the processing from step S150 to step S170 is repeated in this way, a transfer queue that has consumed all the transfer events will eventually appear. Eventually, there is no bus holding the transfer of the update data.

In the process of step S160, when the processing circuitry 11 determines that there is no bus on which transfer is suspended (S160: NO), the process proceeds to step S180. In the process of step S180, the processing circuitry 11 determines whether or not the transfer of all the update-data is completed.

In the process of step S180, when the processing circuitry 11 determines that the transfer of all the update-data is not completed (S180: NO), the process of step S180 is repeated. That is, in this case, the transfer of the update data is continued without reassigning the transfer thread. On the other hand, when the processing circuitry 11 determines in the process of step S180 that the transfer of all the update-data has been completed (S180: YES), the transfer routine ends. Thus, the transfer of the update data from the rewriting device 10 to the gateway device GW_ECU is completed.

Operation of Present Embodiment

When the number of buses for transferring the update data is larger than the number of transfer threads, only the update data of the transfer queue to which the transfer thread is assigned is transferred. Therefore, when the assignment of the transfer thread is not changed in the middle, only the update of the program of the electronic control unit connected to a part of the buses proceeds. As a result, the progress of updating the program is greatly different between the buses. In this case, it takes a long time until the transfer of the update data of the last remaining transfer queue is completed and the update of the program of the electronic control unit is all completed. On the other hand, the rewriting device 10 reassigns the transfer thread to the transfer queue having the larger transfer data amount and continues the parallel transfer every time the transfer of one piece of update data is completed. Thus, the rewriting device 10 can prevent the progress of the transfer of the update data from being biased to any one of the transfer queues.

Figure 4:
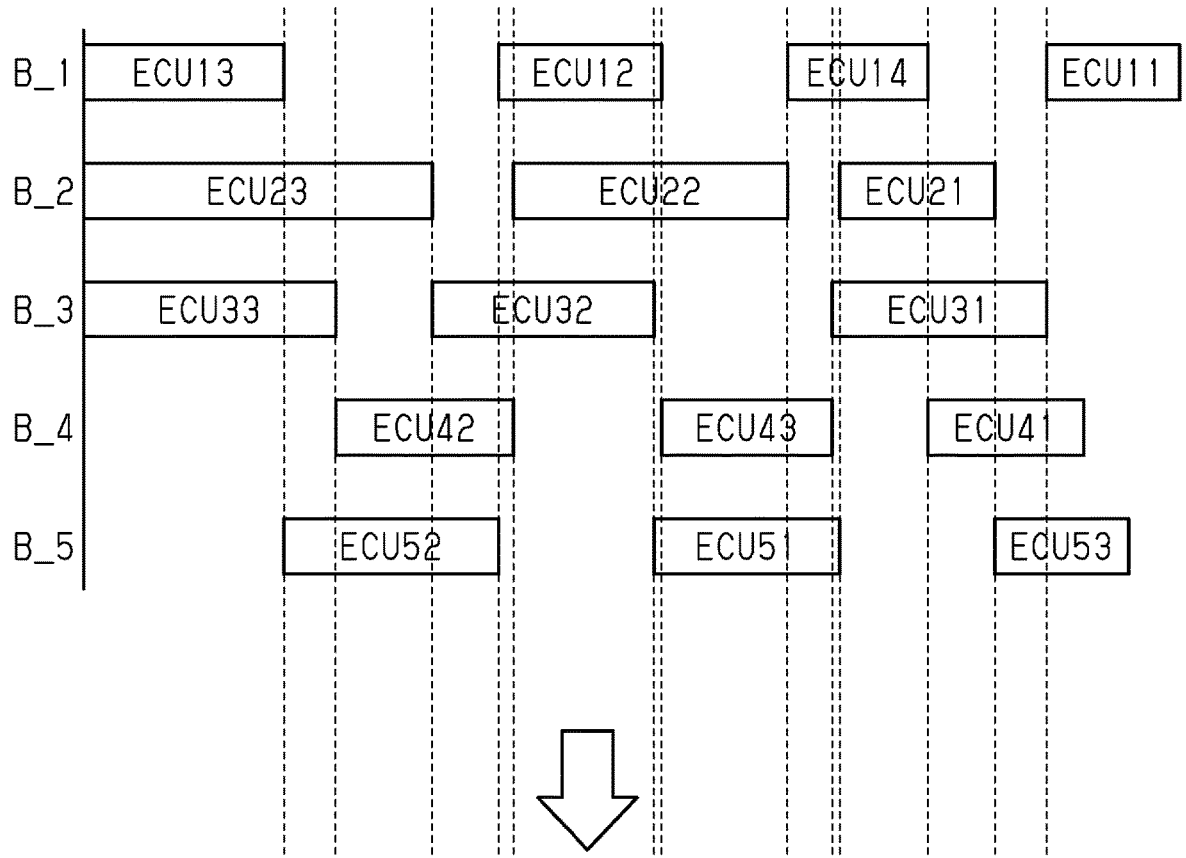
FIG. 4 is a timing diagram showing the transfer schedule of FIG. 3 for each bus and each thread.
Figure 4:
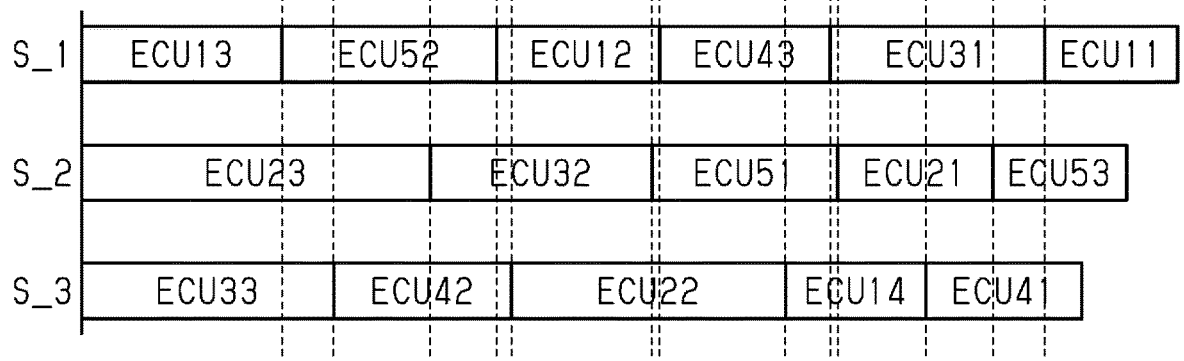

Part (a) of FIG. 4 shows a transfer schedule of update data in each bus until the transfer routine is completed in the example shown in FIG. 3. Part (b) of FIG. 4 is a diagram in which the transfer schedules are arranged for each transfer thread. As shown in part (b) of FIG. 4, each transfer thread always transfers any update data. The total amount of transfer data transferred by the transfer thread is not largely different between the transfer threads. That is, in the transfer of the update data using the rewriting device 10 of the present embodiment, the execution period of the parallel transfer using all the transfer threads is long. Thereby, the rewriting device 10 can shorten the time until the transfer of all the update data is completed.

Advantages of Present Embodiment (1) The rewriting device 10 can adjust the transfer order of the update data so as to shorten the transfer time of the update data. The rewriting device 10 can complete the update of the program in the vehicle on-board network system at an early stage.

(2) In the rewriting device 10, the processing circuitry 11 creates a transfer queue for each bus by arranging the update data in descending order of data amount. As a result, when the transfer thread is assigned to the transfer queue, the update data having a larger data amount is transferred first. The closer the transfer routine is to the end, the smaller the amount of update data remains. Therefore, the closer to the end of the transfer routine, the shorter the change cycle of the assignment of the transfer thread. Therefore, the rewriting device 10 can adjust the transfer order of the update data so as to minimize the difference between the transfer threads in the total amount of the transfer data transferred by the transfer thread. The rewriting device 10 can adjust the transfer order of the update data so as to shorten the transfer time of the update data as much as possible.

(3) In the rewriting device 10, when the number of buses is less than or equal to the number of threads, the processing circuitry 11 assigns threads to all the transfer queues one by one and transfers update data in parallel. When the threads are assigned to all the buses, the process of comparing the transfer data amounts of the respective transfer queues between the transfer queues is not executed. Therefore, the rewriting device 10 can reduce the processing load of the processing circuitry 11.

(4) The rewriting device 10 includes the communication device 15. In the rewriting device 10, processing circuitry 11 stores update data downloaded from a server 20 by using a communication device 15 in a storage device 12. The rewriting device 10 can download and use the latest update data from the server 20.

(5) The program rewriting method executed by the above-described rewriting device 10 includes a step of acquiring information on the number of the buses connected to the gateway device GW_ECU and on the electronic control units connected to the respective buses. The program rewriting method includes a step of creating, based on the acquired information, a transfer queue for each bus by grouping update data to be transferred to each electronic control unit for each corresponding bus. The program rewriting method includes a step of comparing transfer data amounts in the transfer queues with each other, and assigning multiple threads to the transfer queues one by one, starting with a transfer queue with a relatively large transfer data amount. The program rewriting method includes a step of performing parallel transfer of the update data of the transfer queues to which the threads are assigned to the gateway device GW_ECU by using the threads. The program rewriting method includes a step of, when transfer of a piece of the update data in any one of the transfer queues is completed, selecting a transfer queue having a largest transfer data amount from among the transfer queue in which the transfer of the piece of the update data is completed and one or more transfer queues to which the threads have not been assigned and in which transfer of the update data is suspended. The program rewriting method includes a step of continuing the parallel transfer by assigning, to the selected transfer queue, the thread assigned to the transfer queue for which the transfer has been completed. The program rewriting method is capable of adjusting the order of transfer of the update data so as to shorten the transfer time of the update data. The above-described program rewriting method is capable of quickly completing updates of programs in the vehicle on-board network system.

Modifications

The present embodiment may be modified as follows. The present embodiment and the following modifications can be combined as long as the combined modifications remain technically consistent with each other.

Figure 5:
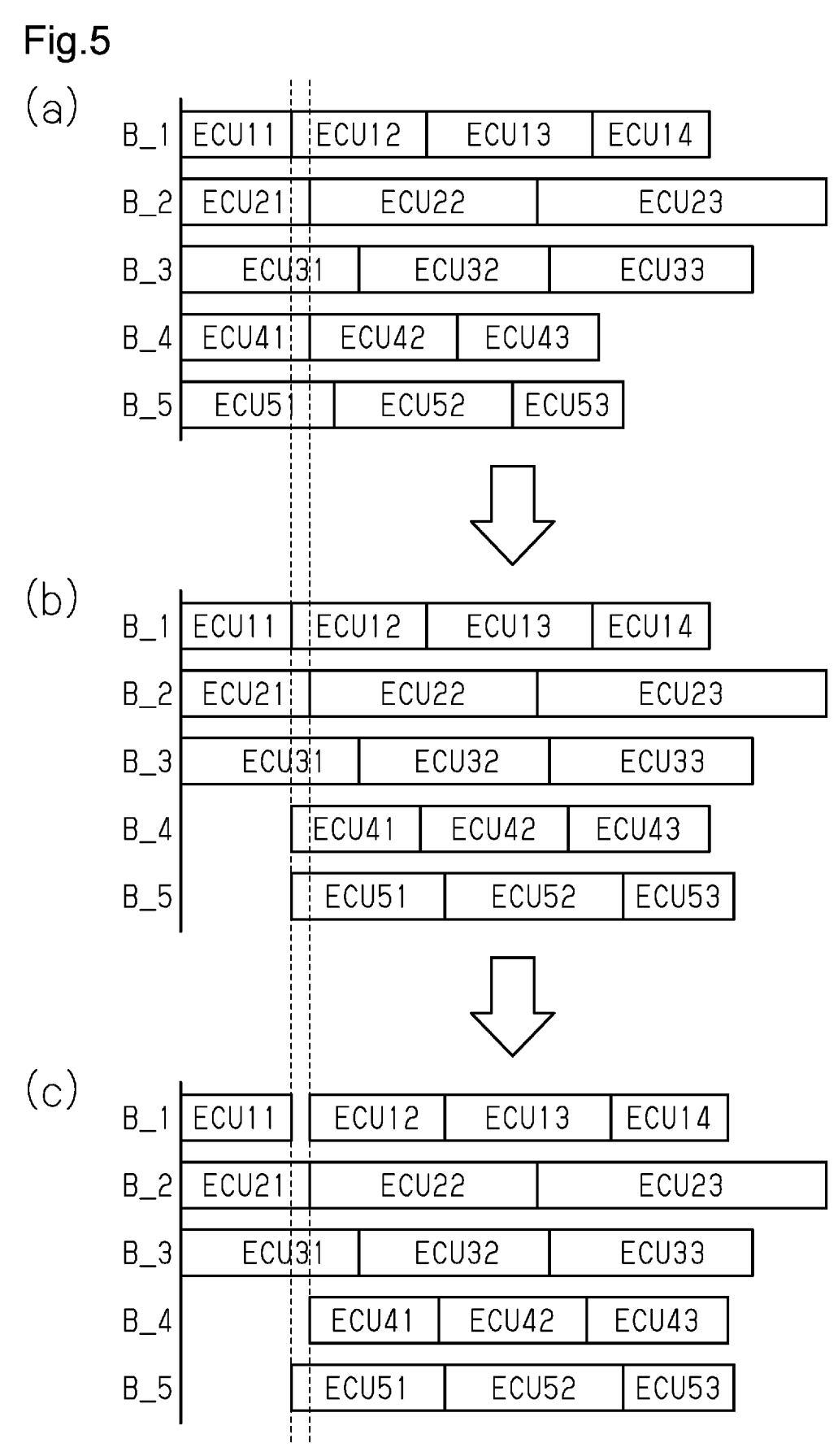

The processing circuitry 11 may not necessarily generate the transfer queue for each bus by arranging the update data in descending order of the data amount. Part (a) of FIG. 5 shows an example in which a transfer queue for each bus is created without arranging update data in descending order of data amount. The data amount of each update data is the same as that in the example illustrated in part (a) of FIG. 3. Also in this case, the transfer routine can be executed in the same manner as in the above embodiment. As shown in part (b) of FIG. 5, when the transfer of the update of the electronic control unit ECU 11 is completed, the transfer thread is assigned to the transfer queue of the fifth bus B_5 having the largest remaining transfer amount. Then, as shown in part (c) of FIG. 5, when the transfer of the update of the electronic control unit ECU 21 is completed, the transfer thread is assigned again to the transfer queue of the second bus B_2 having the largest remaining transfer amount.

Figure 6:
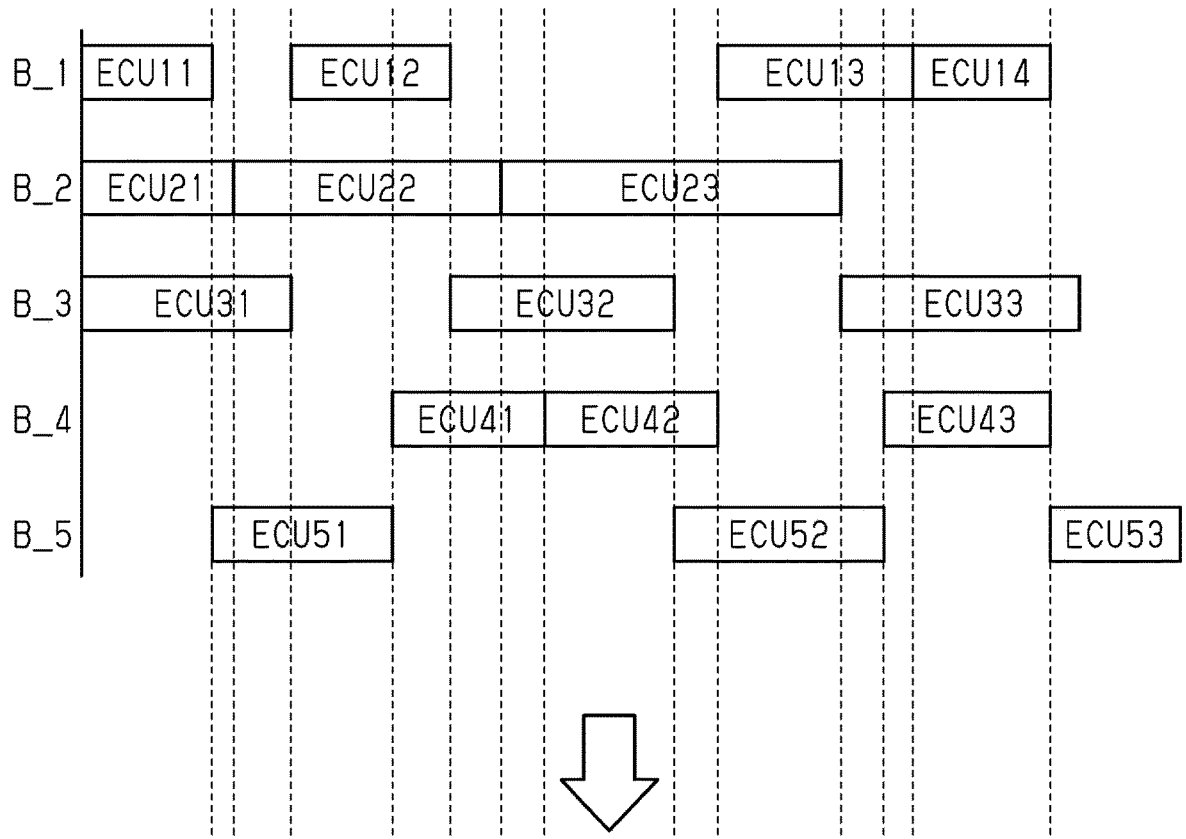
FIG. 6 is a timing diagram showing the transfer schedule according to the modification shown in FIG. 5 for each bus and each thread.
Figure 6:
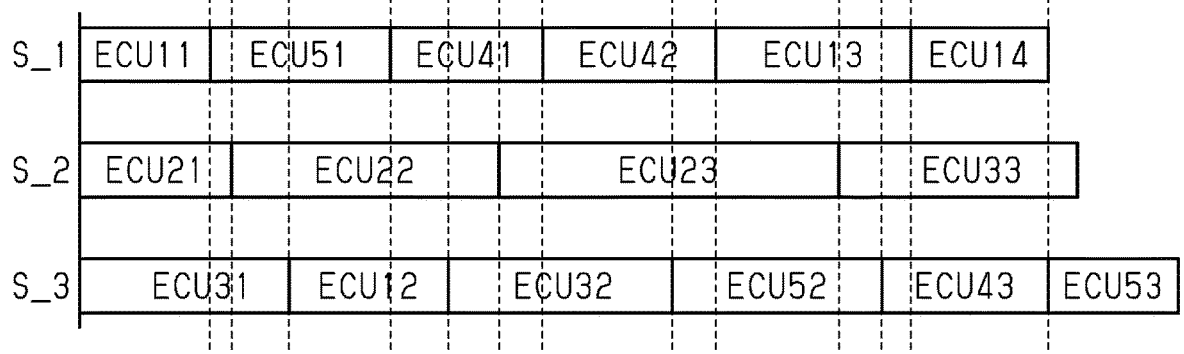

Part (a) of FIG. 6 shows a transfer schedule of update data in each bus until the transfer routine is completed in the example shown in FIG. 5. Part (b) of FIG. 6 is a diagram in which the transfer schedules are arranged for each transfer thread. As shown in part (b) of FIG. 6, each transfer thread always transfers any update data. The difference between the transfer threads in the total amount of transfer data transferred by each transfer thread is larger than that in the example illustrated in part (b) of FIG. 4, but is not so large. That is, even if the process of arranging the update data in descending order of the data amount is omitted, the rewriting device 10 can shorten the time until the transfer of all the update data is completed.

The number of transfer threads is not limited to three. The number of transfer threads may be two or four or more.

In the above-described embodiment, the program is updated in order from the electronic control unit to which the corresponding update data has been transferred. The vehicle network system may be configured such that when transfer of all update data is completed, all electronic control units that have received the update data start updating the program. In any case, the quicker the transfer of all the update data is completed, the quicker the update of the programs of all the electronic control units in the vehicle on-board network system can be completed.

The rewriting device 10 may not include the communication device 15. The rewriting device 10 that does not include the communication device 15 can acquire the latest update data by being connected by wire to a device in which update data is recorded.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A program rewriting device configured to be connected to a vehicle on-board network system including multiple buses connected to a gateway device, the program rewriting device being configured to rewrite programs of multiple electronic control units connected to each of the buses, the program rewriting device comprising:
   a storage device configured to store update data to be transferred to the electronic control units; and
   processing circuitry; and
   multiple threads configured to transfer the update data to the gateway device, wherein the processing circuitry is configured to:
      acquire information about a number of the buses connected to the gateway device and about the electronic control units connected to each bus;
      create, based on the information, a transfer queue for each bus by grouping the update data to be transferred to each electronic control unit for each corresponding bus;
      compare transfer data amounts in the transfer queues with each other, and
      assigns the multiple threads to the transfer queues one by one, starting with the transfer queue with a relatively large transfer data amount;
      perform parallel transfer of the update data of the transfer queues to which the threads are assigned to the gateway device by using the threads;
      each time transfer of a piece of the update data in any one of the transfer queues is completed, select a transfer queue having a largest transfer data amount from among the transfer queues in which the transfer of the piece of the update data is completed and one or more transfer queues to which the threads have not been assigned and in which transfer of the update data is suspended; and
      continue the parallel transfer by assigning, to the selected transfer queue, the thread assigned to the transfer queue for which the transfer has been completed.

2. The program rewriting device according to claim 1, wherein the processing circuitry is configured to arrange, when creating the transfer queues, pieces of the update data in a descending order of data amount.

3. The program rewriting device according to claim 1, wherein the processing circuitry is configured to assign the threads to all the transfer queues one by one when the number of the buses is less than or equal to the number of the threads.

4. The program rewriting device according to claim 1, further comprising a communication device,
   wherein the processing circuitry is configured to cause the storage device to store the update data downloaded from a server using the communication device.

5. A program rewriting method executed by a program rewriting device for a vehicle on-board network system including multiple buses connected to a gateway device, the program rewriting device being configured to rewrite programs of multiple electronic control units connected to each of the buses, the program rewriting method comprising:
   acquiring information about a number of the buses connected to the gateway device and about the electronic control units connected to each bus;
   creating, based on the information, a transfer queue for each bus by grouping update data to be transferred to each electronic control unit for each corresponding bus;
   comparing transfer data amounts in the transfer queues with each other, and assigning multiple threads to the transfer queues one by one, starting with the transfer queue with a relatively large transfer data amount;
   performing parallel transfer of the update data of the transfer queues to which the threads are assigned to the gateway device by using the threads;
   when transfer of a piece of the update data in any one of the transfer queues is completed, selecting a transfer queue having a largest transfer data amount from among the transfer queues in which the transfer of the piece of the update data is completed and one or more transfer queues to which the threads have not been assigned and in which transfer of the update data is suspended; and
   continuing the parallel transfer by assigning, to the selected transfer queue, the thread assigned to the transfer queue for which the transfer has been completed.

* * * * *